Patented Jan. 5, 1937

2,066,533

UNITED STATES PATENT OFFICE 2,066,533

HYDROGENATION PROCESS FOR PRODUCING HYDROXY ACIDS AND LACTONES

Wilbur A. Lazier, Marshallton, Del., assignor to E. I. du Pont de Nemours & Company, Wilmington, Del., a corporation of Delaware No Drawing. Application September 22, 1933, Serial No. 690,569

24 Claims. (Cl. 260—112)

This invention relates to a process for the production of hydroxy acids and lactones of hydroxy acids. More specifically it relates to a process for the catalytic hydrogenation of dibasic acids and esters of dibasic acids having more than one carbon atom per carboxyl group, wherein the hydrogenation is so controlled as to produce hydroxy acids and lactones as the major products of the reaction.

This case is a continuation in part of application Serial Number 445,224, filed April 17, 1930, and application Serial Number 629,754, filed August 20, 1932.

In copending application Serial Number 629,754, filed August 20, 1932 and U. S. Patent No. 1,839,974 issued January 5, 1932, there are disclosed new methods for hydrogenating carboxylic acids and esters for the production of various alcohols, esters, and other valuable products. Further investigation has led to the discovery that when dibasic acids and/or their esters are hydrogenated, the process takes place in fairly definite steps and that by suspending the hydrogenation at substantially the midpoint of the reaction, hydroxy acids and/or lactones of hydroxy acids may be produced. By this method it is therefore possible to prepare economically, polymerizable organic compounds heretofore obtainable only by extremely difficult and costly steps of organic synthesis.

This invention has as an object a new and novel process whereby dibasic acids and dibasic esters having more than one carbon atom per carboxylic group may be converted to hydroxy acids and lactones of hydroxy acids. A further object is to provide a process for obtaining the corresponding hydroxy acids and/or lactones from aliphatic dibasic carboxylic acids and esters of aliphatic dibasic carboxylic acids having more than one carbon atom per carboxylic group which may contain as substituents, aromatic groups. A still further object is to obtain the above mentioned products by means of a carefully controlled hydrogenation process. Another object is to carry out the above mentioned processes by the use of highly efficient composite hydrogenation catalysts. Other objects will appear hereinafter.

These objects are accomplished by the following invention which, in its general aspects, comprises heating the acids and esters to be converted, admixing them with hydrogen, and contacting the said mixtures with a hydrogenating catalyst comprising either a single hydrogenating metal or its oxide, or a mixture of hydrogenating metals and/or their oxides at an elevated temperature and pressure and then suspending the process at such a point that a substantial portion of the carboxyl groups remain unreduced so that opportunity is afforded for only one of the carboxylic groups in the original compound to be reduced to an alcoholic group.

In the following examples several of the preferred embodiments of the invention have been set forth, but they are presented for purposes of illustration and not as limitations.

Example 1

A hydrogenation catalyst was prepared as follows: Twenty-three grams of cadmium nitrate, 24 grams of copper nitrate, and 245 grams of zinc nitrate were dissolved in 500 cc. of water and mixed with an equal volume of water containing 126 grams of ammonium bichromate and 75 cc. of 28% ammonium hydroxide. After stirring, the mixture was exactly neutralized with additional ammonium hydroxide and allowed to settle. After several washes by decantation, the precipitate was dried, ignited at 400° C. and compressed into tablets or grains suitable for use in catalytic gas apparatus.

Twenty-five cc. of the mixed chromite catalyst prepared as above was loaded into a converter and heated to a temperature of 380° C. in a stream of hydrogen. The pressure was maintained at 3000 lbs. per square inch while melted adipic acid was pumped over the catalyst. Seven hundred and fifty-five gms. of this acid was pumped through the reaction system in two hours, during which time the volume of hydrogen, measured at ordinary conditions of temperature and pressure, passed through the catalyst was 560 liters. Analysis of the condensed products showed that a substantial proportion of the carboxyl groups had survived the hydrogenation at the high rate of flow employed and a good yield of the lactone of hydroxy caproic acid was obtained.

Example 2

Fifteen hundred grams of copper nitrate dissolved in 4 liters of water was mixed with a solution containing 1000 grams of ammonium chromate in an equal volume of water. Ammonium hydroxide was added to neutralize the acidity developed during precipitation of the copper ammonium chromate. The precipitate was filtered, dried, and ignited at a temperature of 400° C. after which it was extracted twice with dilute acetic acid. The resulting copper chromite powder was employed for hydrogenation without further treatment. Two hundred fifty grams of ethyl sebacate and 20 grams of copper chromite, prepared as described, were placed in a shaking autoclave. Hydrogen was introduced until the pressure reached 3000 pounds per square inch. The mixture was heated to 325° C. and agitated until the drop in pressure indicated that one half the amount of hydrogen needed for complete hydrogenation had been absorbed. Separation of the products gave the following results: Fifty-six grams of decamethylene glycol were recovered. One hundred twenty eight grams of acidic material was recovered from the alkaline liquors. This material was boiled with 450 cc. of glacial acetic acid and 60 cc. of hydrochloric acid. On cooling, crystals separated which were filtered and then washed with acetic acid. The crystals weighed 51 grams. Their melting point was 128° C. to 130° C. The filtrate was concentrated in vacuo and gave an additional yield of 20 grams of crystal which were washed with benzol and dried, making a total of 71 grams of the acetate of ω-hydroxydecanoic acid. The filtrate was distilled at 4 mm. pressure and gave two fractions. The first weighed 8 grams and boiled at 165°–185° C., and consisted largely of acetyl ω-hydroxydecanoic acid. The second fraction weighed 20 grams and boiled at 185°–210° C.

*Example 3*

Two hundred fifty grams of diethyl hexahydrophthalate and 20 grams of copper chromite catalyst, prepared as in Example 2, were placed in a shaking autoclave. Hydrogen was introduced until the pressure reached 3000 lbs. per square inch. The mixture was heated to 265° C. and agitated for 8 hours. Analysis of the crude product for ester content showed the presence of 35% of residual ester. On recovery and separation of the products, there was obtained a 40% yield of hexahydrophthalide (lactone of hexahydro ortho hydroxymethyl benzoic acid).

It is evident from the examples given, that both the batch method and the continuous method of hydrogenation are applicable to the processes of this invention. The batch method will be preferable when the compound to be reduced is a solid or very viscous liquid at ordinary temperature or when the quantities of material to be handled are small.

Although certain definite conditions of operation, such as time, temperature, pressure, and rate of flow of the material to be treated in the presence of the catalyst, have been indicated in the above examples, it will be apparent that these factors may be varied within wide limits within the scope of the invention. The success of the process depends on the control of the hydrogenation, which may be accomplished in several ways. As the reduction of one carboxyl group in each molecule of the compound probably takes place before subsequent carboxyl groups are reduced, a careful adjustment of the time factor will enable suspension of the hydrogenation in order to permit a maximum yield of hydroxy compound. Experimentation shows that in most cases, but particularly in the case of batch hydrogenations, conditions of equilibrium prevail and may be the determining factor in the overall carboxyl conversion. Hence an elevated temperature will affect the equilibrium of the reaction in a direction unfavorable to high conversion and so may be used to control the extent of hydrogenation. Similarly, low pressure affects the conversion adversely and may be employed as a means of obtaining optimum yields of hydroxy compounds. Another method of control is found in the type of catalyst used. A catalyst of low activity may be used to retard conversion, with resulting better yields of hydroxy compounds. In the case of continuous hydrogenation still another method of control may be obtained by adjusting the space velocity of the reducible compound in respect to the catalyst. A high space velocity will give a shorter time of contact of the reducible compound with the catalyst and so enable the conversion to be controlled.

The preferred temperature for this process is in the range from 200° C. to 450° C., but it is to be understood that the invention is not limited to the use of these temperatures, especially when a higher temperature is needed as a controlling factor of the hydrogenation, or when other conditions make necessary a variation from the limits mentioned. The preferred pressure for our process ranges form 1500 to 5000 pounds per square inch although the invention is not limited to these pressures since they may be varied somewhat depending on the compound to be treated and especially when pressure is used as one of the controlling factors of hydrogenation as described above.

When operating by the continuous method, the ratio of hydrogen to the acids and esters may also be varied over a wide range. While it may not always be strictly necessary, it is preferred to use an excess of hydrogen, say from 2 to 10 mols per molecular unit of carboxyl groups hydrogenated. However, a low hydrogen ratio may be cited as still another means of controlling the amount of hydrogenation.

The quantity of hydrogen absorbed is the best indication of the progress of hydrogenation, and the run should be stopped when one-half the calculated amount of hydrogen necessary for complete hydrogenation has been absorbed by the compound being hydrogenated. The consumption of hydrogen may be measured either by the drop in pressure if the hydrogen supply is not directly connected to the autoclave, or by metering the hydrogen consumed when the supply of hydrogen is directly connected to the autoclave.

An additional method of determining the midpoint of hydrogenation is to take samples of the mixture during hydrogenation. A determination of the saponification number of the mixture gives an accurate measure of the extent of hydrogenation. However, the data obtained may not be applicable until subsequent runs are made as considerable time is consumed in making determinations of saponification numbers.

Preliminary test runs may be made to obtain the proper time for half-hydrogenation for a specific set of operating conditions.

Modifications or combinations of the described methods of control are to be considered within the scope of this invention.

The rate at which the acids and esters may be passed over the catalyst is a function of the molecular weight of the acids and esters and the catalytic activity of the contact mass. For ordinary compounds such as those described in the examples, I prefer to pass from 2 to 8 volumes per hour per unit volume of catalyst, but higher rates may be employed to further limit the conversion.

The acids and esters may be employed in liquid form or, if they are solids, may be dissolved in a solvent and the solution treated as for the pure compounds. Mixtures of acids, mixtures of esters, or mixtures of acids and esters may be reduced as well as the individual compounds in a pure state, to obtain mixtures of hydroxy acids and their lactones.

Although thus far the description has included the use of catalysts of only two compositions, it is to be distinctly understood that the use of these is not a vital factor in the success of the invention, as it is only necessary to employ any good hydrogenation catalyst under the conditions described to effect the reduction desired.

Catalysts found suitable for the synthesis of methanol from water gas are, in general, also suitable for the hydrogenation of carboxylic esters. For example, reduced metals such as silver, copper, tin, cadmium and lead, and in certain cases iron, cobalt, or nickel, may be used. Good results are obtained with fused copper oxide, either wholly or partially reduced. The copper catalyst may be promoted with oxide promoters such as manganese oxide, zinc oxide, magnesium oxide or chromium oxide. These promoted catalysts may be physical mixtures or chemical compounds containing copper, e. g., copper chromate or chromite. A metallic catalyst in the form of a powder may also be used, in which case it is advisable to employ a suitable supporting material such as silica, activated carbon, alumina, or a naturally occurring earth such as kieselguhr. It has been found that elementary nickel supported on kieselguhr and prepared by reduction of the hydroxide or carbonate may be used for the hydrogenation of certain esters, provided a sufficiently high temperature and pressure are used. Such a catalyst, however, has the disadvantage that it has a tendency to carry the hydrogenation completely to hydrocarbons rather than to the more desirable alcoholic intermediate compounds.

Certain metallic oxides belonging to the class known as difficultly reducible oxides and having both hydrogenating and dehydrogenating propensities may be employed. By the term difficultly reducible is meant that the oxides are not substantially reduced to metal by prolonged exposure in a state of purity to the action of hydrogen at atmospheric pressure and at a temperature of 400–450° C. Such oxides suitable for the hydrogenation of esters are zinc oxide manganese oxide, magnesium oxide, etc. These oxides may be employed either alone or in combination with each other or with other oxides which have a promoting action. Preferably the oxide employed as a promoter for the hydrogenating oxide has little activity of itself or is much less active than the hydrogenating oxide employed with it, but it yet serves to further promote the activity of the more active oxide.

It will be noted that the hydrogenating oxides are, in general, of a basic character. The promoting oxides are preferably chosen from the group consisting of the more acidic oxides of elements selected from the higher groups of the periodic table. For example, the oxides of chromium, vanadium, tungsten, titanium, and molybdenum are suitable promoters for zinc oxide or manganese oxide. Of these, chromium oxide is preferred, since it inhibits more the tendency towards catalyzing destructive side reactions. It has been found to be advantageous to use chromium oxide in physical admixture or in chemical combination, e. g., as a chromate or chromite, with a large number of oxides ordinarily regarded as easily reducible. The acidic promoting oxides other than chromium oxide may also be used either in physical admixture or in chemical combination, e. g., as tungstates, vanadates, molybdates, etc. The reducible oxides when combined or otherwise associated with chromium oxides are only partially reduced under conditions of operation and are found to be very effective catalysts for the hydrogenation of esters. The oxides of cadmium, copper, tin, and bismuth are all examples of oxides that may be employed in the more difficultly reducible form. Catalysts consisting of both reduced metals and non-reduced oxides are active even though the reaction is carried out at a temperature above the fusion point of the metal. Such mixed catalysts are conveniently employed initially in the form of chromates or chromites of the metals. Basic zinc chromate when partially reduced with hydrogen is a suitable catalyst for the hydrogenation of esters by virtue of its high activity and absence of side reactions. It may be prepared by treating zinc oxide with chromic acid, by precipitation of the zinc salt with an alkali chromate or by any other suitable means. Manganese oxide-chromium oxide mixtures are also suitable as well as copper oxide in combination with chromium oxide or other acidic oxides.

In carrying out the hydrogenation of esters and acids, one of the catalysts previously disclosed in co-pending application No. 285,501, filed June 14, 1928 (now Patent No. 1,857,921, dated May 10, 1932), may be used. These catalysts are included among those outlined in the preceding paragraph. A preferred catalyst containing a single hydrogenating metal oxide may be prepared according to the general method described in U. S. Patents 1,746,782 and 1,746,783. This latter type of catalyst is prepared by ignition of a hydrogenating metal chromate, or of a hydrogenating metal ammonium chromate, or it may be prepared by reduction by hydrogen of the said chromates at a temperature of 500° C. or higher. Particularly good results have been obtained in ester hydrogenation by preparing a catalyst according to the method of U. S. Patent 1,746,783 wherein a double ammonium chromate of a hydrogenating metal is heated at about 600° C. to form a chromite catalyst. As indicated in the examples success has attended the use of mixtures of the chromites of two or more hydrogenating metals. The multiple chromite catalyst compositions described in the examples and disclosed in my copending application Serial No. 470,238, filed July 23, 1930 (now Patent No. 1,964,001, dated June 26, 1934), are eminently suited to use in the present invention. The multiple chromite catalyst compositions described in the said copending application may be prepared by precipitation of a mixture of chromates from solution by adding an alkali metal chromate to an aqueous solution of a mixture of hydrogenating metal salts, followed by ignition or by high temperature treatment with hydrogen. The preferred procedure comprises the use of a chromite composition consisting substantially of zinc chromite but containing lesser quantities of the chromates or chromites of copper and cadmium. The activity of chromite catalysts may be further enhanced by subjecting the ignited chromites to an acid extraction process which serves to remove from the composition a portion of the hydrogenating metallic oxide which is not combined with the promoter oxide.

The advantages attending the use of difficultly reducible oxides or reducible oxides in a difficultly reducible form are several and substantial. These catalysts possess a high activity and are sturdy in character. They are relatively immune to degenerative processes such as sintering or poisoning, being thus distinguished from metal catalysts which deteriorate rapidly when subjected to excessive heating. Unlike certain metal catalysts, they possess a small tendency to carry the hydrogenation beyond the alcohol stage, for example to the production of the corresponding hydrocarbon.

It is desired to make mention of the utility of catalysts containing copper oxide promoted by chromium oxide either in physical mixture or in chemical combination as copper chromate or copper chromite. This catalyst is particularly useful for liquid phase ester hydrogenation reactions.

The catalysts described above, in addition to the modified copper-chromium catalysts last mentioned, may be modified or promoted by the addition of oxides or carbonates of alkali metals or of alkaline earth metals, or of basic compounds of alkali metals or of alkaline earth metals, that is, compounds of these alkali-forming metals with acids which are weaker than the metal hydroxide. Other suitable promoters are compounds containing an alkali or alkaline earth metal combined with the acid radical of an oxygen-containing acid, e. g., barium chromate. These compounds will all be classified under the term "basic compounds of alkali-forming metals." One tendency of the basic promoter is to suppress the further hydrogenation to hydrocarbon of the formed alcohol.

It will be apparent from the examples given that the process of our invention is applicable to a large group of compounds comprising multiple basic carboxylic acids and their esters. This group includes such acids as citric acid and aliphatic dibasic acids having more than one carbon atom per carboxyl group, such as succinic, glutaric, adipic, suberic, sebacic, and acids having even a larger number of carbon atoms and the esters of these acids. The process is valuable also for conversion of hydroaromatic multiple basic acids and their esters as typified by such compounds as diethyl hexahydrophthalate, monobutyl camphorate and the similar group of acids in the hydronaphthalene series. The process is also applicable to substituted acids such as tartaric acid.

The multibasic carboxylic acids and their esters are either natural products or are easily obtainable by well known methods of synthesis. The corresponding hydroxy acids and lactones have been extremely rare because of the difficult and costly syntheses required for their production. This invention provides a practical and economical method for producing these compounds, and it may be expected that as a result of my above described process these products will find a wider application in many fields of technology such as in the manufacture of plasticizers, drugs, resins, and textile finishing materials.

The above description and specific examples are to be construed as illustrative only and not as limiting the scope of the invention. Any modification or variation therefrom which conforms to the spirit of the invention is intended to be included within the scope of the claims.

I claim:

1. A process of producing hydroxy acids and lactones which comprises reacting hydrogen and a compound of the type:

in which $n$ is a number greater than 1, where R is a non-aromatic radical which contains at least one carbon atom per carboxyl group, the carboxyl groups being joined to different carbon atoms in R by carbon-carbon bonds, and where X is a radical of the group consisting of hydrogen and a hydrocarbon residue of an alcohol, under superatmospheric pressure at a temperature in excess of 200° C. in the presence of a hydrogenation catalyst, and stopping the reaction while a substantial portion of the carboxyl groups remains unreduced, then separating the hydroxy acids and lactones from the reaction product.

2. The process of claim 1, characterized in that the temperature is 200°–450° C.

3. The process of claim 1, characterized in that the temperature is 200°–450° C. and the pressure is above 100 atmospheres.

4. The process of claim 1, characterized in that the catalyst is a member of the class consisting of the hydrogenating metals and their oxides promoted by the presence of a more acidic metal oxide.

5. The process of claim 1, characterized in that the catalyst is a member of the class consisting of the hydrogenating metals and their oxides promoted by the presence of chromium oxide.

6. The process of claim 1, characterized in that the compound being treated is an ester.

7. The process of claim 1, characterized in that the compound being treated is an acid.

8. The process of claim 1, characterized in that X in the compound being treated is an alkyl radical.

9. The process of claim 1, characterized in that R in the compound being treated is a hydroaromatic radical.

10. The process of claim 1, characterized in that the compound being treated is an aliphatic polycarboxylic acid.

11. The process of claim 1, characterized in that the reaction is stopped when one-half the hydrogen necessary for complete hydrogenation has been absorbed.

12. A process of producing hydroxy acids and lactones which comprises reacting hydrogen and a compound of the type:

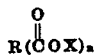

in which $n$ is a number greater than 1 and R is a non-aromatic radical which contains at least one carbon atom per carboxyl group, the carboxyl groups being joined to different carbon atoms in R by carbon-carbon bonds, and where X is a radical of the group consisting of hydrogen and a hydrocarbon residue of an alcohol, at a temperature of 200° to 350° C. and a pressure of 100 to 350 atmospheres in the presence of a mixed chromite catalyst, and stopping the reaction while a substantial portion of the carboxyl groups remains unreduced, then separating the hydroxy acids and lactones from the reaction product.

13. The process of claim 1 characterized in that the temperature is 200° to 450° C. and the pressure is 1500 to 5000 pounds per square inch.

14. The process of claim 1 characterized in that the compound being treated is an aliphatic polycarboxylic acid and the reaction is carried out at a temperature of 200° to 450° C.

15. The process of claim 1 characterized in that the compound being treated is an aliphatic polycarboxylic acid and the reaction is carried out at a temperature of 200° to 450° C. and at a pressure above 100 atmospheres.

16. The process of claim 1 characterized in that the compound being treated is an aliphatic polycarboxylic acid and the reaction is carried out in the presence of a catalyst which is a member of the class consisting of the hydrogenating metals and their oxides, promoted by the presence of a more acidic metal oxide.

17. A process of producing hydroxy acids and lactones, which comprises reacting hydrogen and adipic acid at a temperature of about 380° C. and at a pressure of about 3000 pounds per square inch in the presence of a catalyst comprising essentially cadmium, copper, and zinc-chromites.

18. The process of claim 1 characterized in that "X" in the compound being treated is an alkyl radical and the reaction is carried out at a temperature of 200° to 450° C.

19. The process of claim 1 characterized in that "X" in the compound being treated is an alkyl radical and the reaction is carried out in the presence of a catalyst which is a member of the class consisting of the hydrogenating metals and their oxides promoted by the presence of a more acidic metal oxide.

20. The process of claim 1 characterized in that "R" in the compound being treated is a hydroaromatic radical and the reaction is carried out at a temperature of 200° to 450° C.

21. The process of claim 1 characterized in that "R" in the compound being treated is a hydroaromatic radical and the reaction is carried out at a temperature of 200° to 450° C. and at a pressure above 100 atmospheres.

22. The process of claim 1 characterized in that "R" in the compound being treated is a hydroaromatic radical and the reaction is carried out in the presence of a catalyst which is a member of the class consisting of the hydrogenating metals and their oxides promoted by the presence of a more acidic metal oxide.

23. A process of producing hydroxy acids and glycols, which comprises reacting hydrogen and ethyl sebacate at a temperature of about 325° C. and at a pressure of about 3000 pounds per square inch in the presence of a copper chromite catalyst until approximately one-half of the hydrogen needed for complete saturation is absorbed.

24. A process of producing hydroxy acids and lactones, which comprises reacting diethyl hexahydrophthalate and hydrogen at a temperature of about 265° C. and a pressure of about 3000 pounds per square inch in the presence of a copper chromite catalyst.

WILBUR A. LAZIER.